United States Patent
Zhang et al.

(10) Patent No.: US 11,485,027 B2
(45) Date of Patent: Nov. 1, 2022

(54) ELECTRIC COMPOUND DRIVING THICKNESS IRREGULARLY SHAPED PLATE SPRING FRAMEWORK FLEXIBLE MANIPULATOR

(71) Applicant: Jiangnan University, Wuxi (CN)

(72) Inventors: Jun Zhang, Wuxi (CN); Qiang Wang, Wuxi (CN); Chengpo Wang, Wuxi (CN); Zhengning Tang, Wuxi (CN); Bing Lv, Wuxi (CN)

(73) Assignee: Jiangnan University, Wuxi (CN)

( * ) Notice: Subject to any disclaimer, the term of this patent is extended or adjusted under 35 U.S.C. 154(b) by 49 days.

(21) Appl. No.: 17/087,692

(22) Filed: Nov. 3, 2020

(65) Prior Publication Data
US 2021/0046658 A1 Feb. 18, 2021

Related U.S. Application Data

(63) Continuation of application No. PCT/CN2019/081254, filed on Apr. 3, 2019.

(30) Foreign Application Priority Data

May 4, 2018 (CN) .......................... 201810418817.9

(51) Int. Cl.
*B25J 15/12* (2006.01)
*B25J 9/10* (2006.01)
(Continued)

(52) U.S. Cl.
CPC .............. *B25J 15/12* (2013.01); *B25J 9/108* (2013.01); *B25J 9/1075* (2013.01); *B25J 9/123* (2013.01); *B25J 9/142* (2013.01)

(58) Field of Classification Search
CPC ...... B25J 15/12; B25J 15/022; B25J 15/0206; B25J 9/1075; B25J 9/108; B25J 9/123; B25J 9/142
See application file for complete search history.

(56) References Cited

U.S. PATENT DOCUMENTS 7,445,260 B2 * 11/2008 Nihei ...................... B25J 9/1612
901/34
8,757,690 B2 * 6/2014 Gao ........................ B25J 15/08
294/198
(Continued)

FOREIGN PATENT DOCUMENTS

CN 101422906 A 5/2009
CN 203380907 U 1/2014
(Continued)

*Primary Examiner* — Stephen A Vu
(74) *Attorney, Agent, or Firm* — IPro, PLLC

(57) ABSTRACT

The disclosure discloses an electric-pneumatic hybrid-driving flexible manipulator with spring framework from plates of special-shaped thickness, including a screw shaft motor, an upper seat plate, guide coupling rods, linear bearings, a driving plate, a push plate, short push rods, connecting rods, a bottom seat plate, flexible fingers, a rotating finger holder, a long push rod, a small support, tension springs, single-head bellows muscles and a ridged push plate. The framework of the flexible fingers is a thickness special-shaped plate spring designed according to the principle of equal strength. In the disclosure, through the control of a motor, an angle between a finger knuckle and a grasped object can be adjusted to realize the adjustment of the position of a contact point. To adjust the position of the contact point of the grasped object, the acting point of the contact force and the direction of the acting force can be selected according to situations, so that the grasping is more accurate and reliable. At the same time, the angle between the finger knuckle and the grasped object can be adjusted to adapt to a larger change in size of the grasped object. In the disclosure, a pneumatic system is large in gain and the pneumatic bellows muscles are light, so that the response is quick and the buffering effect is good.

6 Claims, 5 Drawing Sheets

(51) Int. Cl.
*B25J 9/12* (2006.01)
*B25J 9/14* (2006.01)

(56) References Cited

U.S. PATENT DOCUMENTS

| | | | |
|---|---|---|---|
| 8,973,958 B2* | 3/2015 | Allen Demers | B25J 15/022 |
| | | | 901/39 |
| 9,156,170 B2* | 10/2015 | Shiomi | B25J 15/0028 |
| 2007/0035143 A1 | 2/2007 | Blackwell et al. | |
| 2014/0180477 A1* | 6/2014 | Chung | B25J 15/0213 |
| | | | 294/198 |

FOREIGN PATENT DOCUMENTS

| | | | |
|---|---|---|---|
| CN | 105835081 A | 8/2016 | |
| CN | 104816303 B | 11/2016 | |
| CN | 108673541 A | 10/2018 | |
| CN | 108673542 A | 10/2018 | |
| EP | 0619166 A1 | 10/1994 | |

* cited by examiner

ELECTRIC COMPOUND DRIVING THICKNESS IRREGULARLY SHAPED PLATE SPRING FRAMEWORK FLEXIBLE MANIPULATOR

TECHNICAL FIELD

The disclosure belongs to the technical fields of robotics and mechatronics, and particularly relates to an electric-pneumatic hybrid-driving flexible manipulator with spring framework from plates of special-shaped thickness driven by.

BACKGROUND

Aiming at the large-scale production situation in the light industry and food industry, in order to meet the logistics and packaging needs of raw materials, semi-finished products and finished products with complex shapes and diverse physical properties, and to solve the problems of high labor cost and poor working conditions of simple labor, an end grabber for logistics grasping is required. Types of grasped complex objects are as follows: ① irregularly shaped objects with large difference in size (melons, fruits and vegetables); ② fragile objects (poultry eggs and glass ceramic products); ③ deformable soft objects (bread and soft packaging objects); and ④ special-shaped objects disordered in position state and difficult to sort (wine bottles and cosmetic bottles). It can be seen from the above that the material properties, shapes, sizes and position states of complex objects are quite different. A traditional industrial manipulator (end grabber) is of a clamp type or parallel movement type structure, which can only grasp rigid workpieces with the same shape and size, consistent position state and no damage. Humanoid dexterous robotic hands need to perceive the spatial positions and shapes of complex objects, and need to accurately control the movement and grasping force, otherwise the complex objects will be damaged or cannot be grasped reliably. However, at present, the humanoid dexterous robotic hands are still in the laboratory research stage.

The prior art has the following problems: at present, a finger part of an under-actuated manipulator is of a rigid constraint-variable structure, and each finger has three degrees of freedom. Actuated by a single motor, the moving track of a finger at any point when not contacting a grasped object is fixed, which will interfere with a support surface of a small grasped object (such as a conveying belt). The action of two torsion springs needs to be overcome when contacting the grasped object, and the acting points and the sizes and directions of acting forces cannot be changed. It cannot adapt to the inconsistency of the shapes and sizes of the above grasped complex objects, cannot meet the special requirements of not damaging the contact force and grasping the complex objects reliably, and simultaneously will generate a greater impact on the grasped complex objects. Therefore, the under-actuated manipulator with a rigid structure has poor adaptability and cannot effectively grasp the above complex objects.

SUMMARY

In order to solve the problems proposed in the background art, the disclosure provides an electric-pneumatic hybrid-driving flexible manipulator with spring framework from plates of special-shaped thickness, which has the characteristics of wide grasping effect and flexible self-adaptive effect.

In order to achieve the above objectives, the disclosure provides the following technical solutions: an electric-pneumatic hybrid-driving flexible manipulator with spring framework from plates of special-shaped thickness includes a screw shaft motor, an upper seat plate, guide coupling rods, linear bearings, a driving plate, a push plate, short push rods, connecting rods, a bottom seat plate, flexible fingers, a rotating finger holder, a long push rod, a small support, tension springs, single-head bellows muscles and a ridged push plate. The screw shaft motor is installed at an upper end of the upper seat plate. The upper seat plate and the bottom seat plate are fixed as a whole by two guide coupling rods. Both ends of the two guide coupling rods have cylindrical sections respectively in clearance fit with holes on the upper seat plate and the bottom seat plate. A mounted bearing is arranged in a middle position of the bottom seat plate. A screw nut seat driven by the screw shaft motor is fixed on the driving plate. Two linear bearings are installed on the driving plate. The two linear bearings are guided by the corresponding guide coupling rods. The driving plate moves up and down linearly. A fixed finger holder is installed on the bottom seat plate through screws. An upper end of a finger knuckle of the flexible finger on the left is connected to a lower end of the fixed finger holder through a hinge. The push plate is fixedly installed on the driving plate. An upper end of a finger knuckle of the rotating finger holder on the right middle is installed at the lower end of the fixed finger holder through a hinge. The long push rod is fixed on the driving plate. The outer sides of the long push rod and the push plate are both provided with the short push rod. The short push rod is connected to one end of the connecting rod through a hinge. The other end of the connecting rod connected to the flexible finger is connected to a hinge fixing seat on the flexible finger through a hinge. The other end of the connecting rod connected to the rotating finger holder is connected to a hinge fixing seat on the rotating finger holder through a hinge. The driving plate drives the long push rod to move up and down linearly. The ridged push plate is arranged in middle positions of the single-head bellows muscles. Both ends of the ridged push plate are provided with round pressure plates.

The upper ends of the finger knuckles of the two flexible fingers on the right outer side are both connected to the rotating finger holder through hinges. The two flexible fingers on the right outer side rotate coaxially and integrally with the rotating finger holder and the rotating driving plate. The driving comes from two single-head bellows muscles. A shaft sleeve is sleeved over a shaft section at an upper part of the rotating finger holder. The shaft sleeve abuts against a rotating inner ring of the small mounted bearing of the bottom seat plate. A threaded part of the shaft section at the upper part of the rotating finger holder is tightened through a nut. The axial direction of the rotating finger holder is fixed on the small mounted bearing on the bottom seat plate. The small mounted bearing on the bottom seat plate is fixed on the bottom seat plate through screws. The single-head bellows muscles are fixed on a corrugated bayonet of a sealing head by clamps. The sealing head with an air pipe joint is fixed on the small support. The small support is fixed on the driving plate. One ends of the two tension springs are hooked into a hole on a back ridge of the ridged push plate. The other ends of the tension springs are hooked into holes on the small support. The other end of the connecting rod of the short push rod installed on the outer side of the driving plate is connected to the hinge fixing seat on the flexible finger through the hinge.

The flexible finger includes a thickness special-shaped plate spring, a hinge seat, a hinge support, a bracket, a thick sealing head, an air pipe joint, fixing clamps, double-head bellows muscles and a thin sealing head. The hinge seat is fixedly installed on the thickness special-shaped plate spring. Upper ends of the double-head bellows muscles are fixed on a corrugated bayonet of the thick sealing head by the clamps. The air pipe joint is screwed on the thick sealing head through threads. Lower ends of the double-head bellows muscles are fixed on a corrugated bayonet of the thin sealing head by the clamps. Both the thick sealing head and the thin sealing head are fixed on the bracket. The hinge support is fixed on the thickness special-shaped plate spring. A thick torsion spring is sleeved over a hinge mandrel.

Preferably, the push plate drives the short push rod and the connecting rod to adjust an included angle between the finger knuckle of the flexible finger and the bottom seat plate, and the ridged push plate drives the short push rod and the connecting rod to adjust the included angle between the finger knuckle of the flexible finger and the bottom seat plate.

Preferably, the thickness of the rotating push plate is in clearance fit with the width of a guide groove on the outer side of the driving plate, and hinged connection is adopted through cylindrical pins so as to realize rotation.

Preferably, a flat end of the single-head bellows muscles is clamped and fixed on the back ridge of the ridged push plate.

Preferably, the single-head bellows muscles are inflated to drive the small support and the flexible finger on the right outer side to rotate.

Preferably, the driving plate drives the long push rod to move up and down linearly, and the long push rod drives the short push rod and the connecting rod to adjust an included angle between the finger knuckle and the bottom seat plate.

Compared with the prior art, the disclosure has the following beneficial effects:

1. In the disclosure, through the control of a motor, the angle between the finger knuckle and the grasped object can be adjusted to realize the adjustment of the position of a contact point. To adjust the position of the contact point of the grasped object, the acting point of the contact force and the direction of the acting force can be selected according to situations, so that the grasping process does not cause deformation and damage to the object, and the grasping is more accurate and reliable. At the same time, the angle between the finger knuckle and the grasped object can be adjusted to adapt to a larger change in size of the grasped object.

2. In the disclosure, through the control of a high-speed switching valve, the driving pressure of the pneumatic single-head bellows muscles is accurately controlled, and a finger knuckle transposition angle is accurately controlled, so as to realize the accurate control of a finger transposition angle, meet the situations of vertically grasping cylindrical, square, spherical and ellipsoidal objects or horizontally grasping spherical, cylindrical and square objects, and adapt to the shapes of the grasped objects and vertical and horizontal placement changes.

3. In the disclosure, through the control of the high-speed switching valve, the driving pressure of the pneumatic double-head bellows muscles is accurately controlled, so as to realize the accurate control of the grasping force and the flexible self-adaptability of the acting point and size of the grasping force.

4. In the disclosure, a pneumatic system is large in gain and the pneumatic bellows muscles are light, so that the response is quick and the buffering effect is good.

Figure 1:
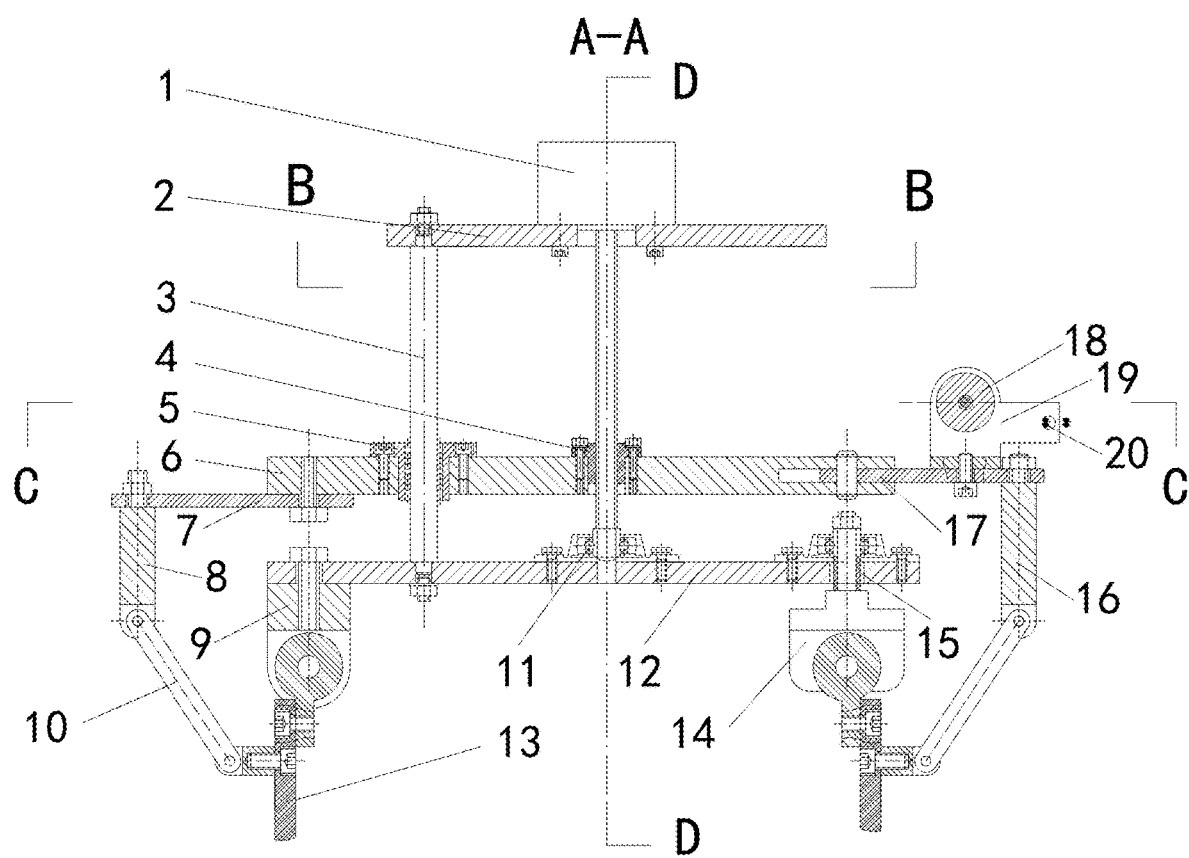
FIG. 1 is a schematic structural diagram of the disclosure.
Figure 2:
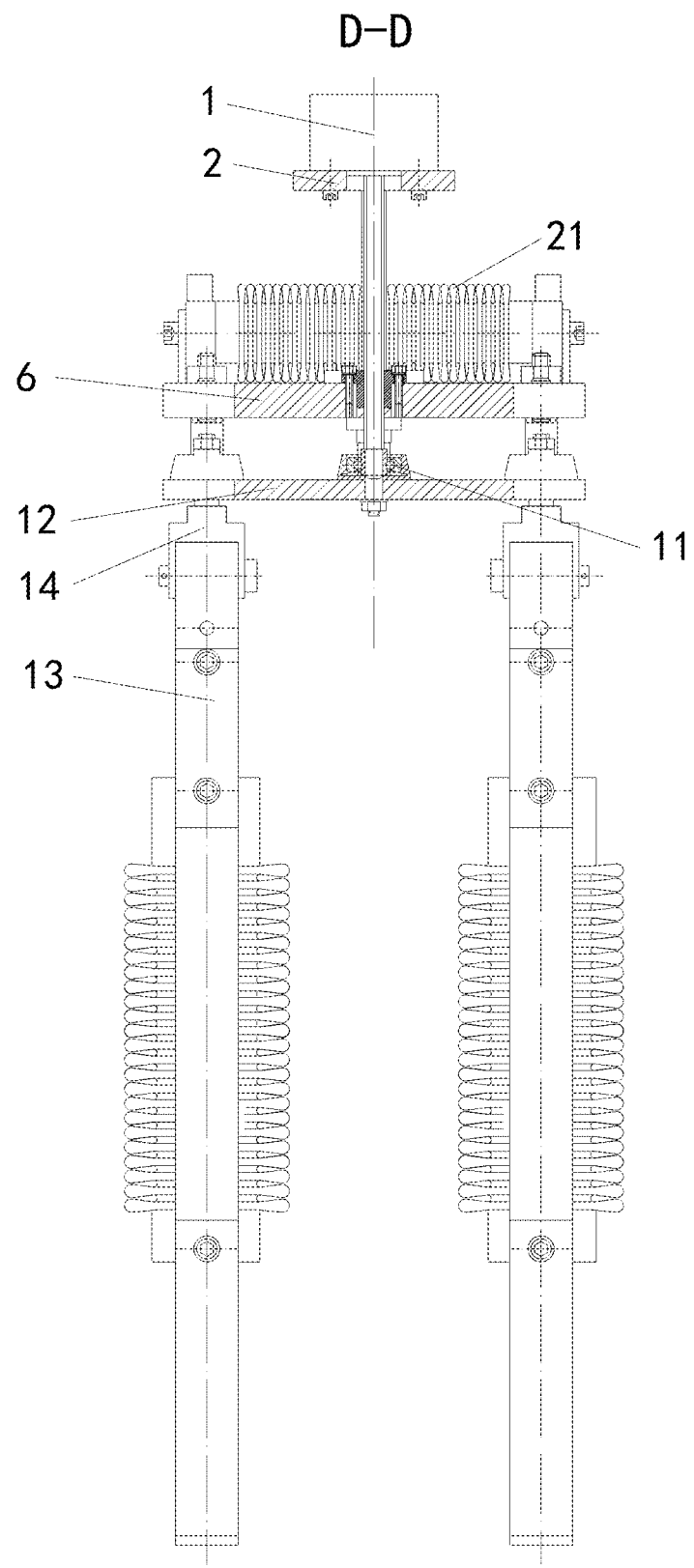
FIG. 2 is a D-D schematic structural diagram of the disclosure.
Figure 3:
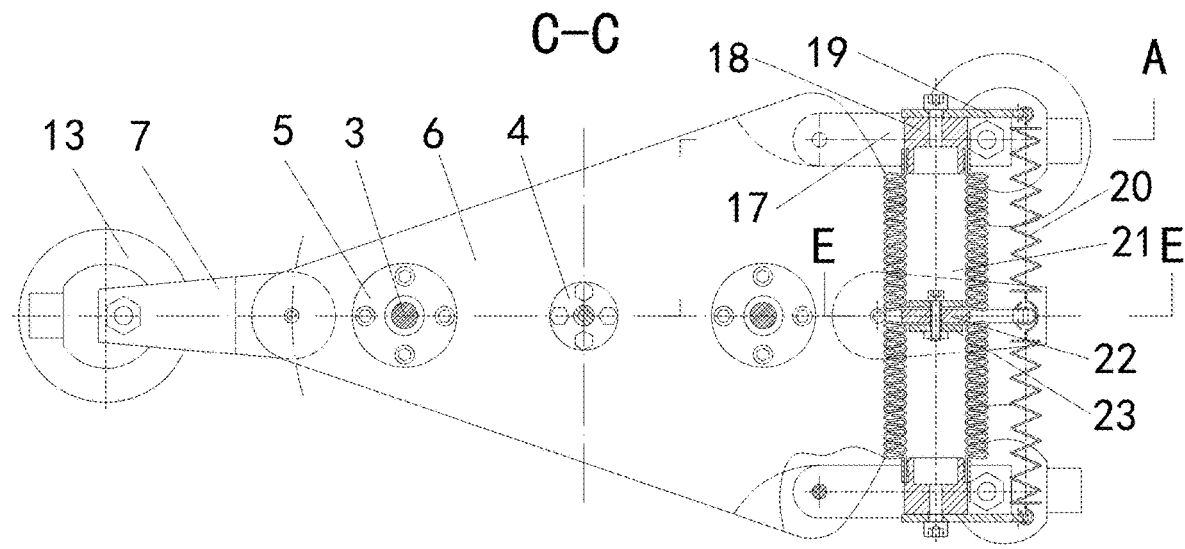
FIG. 3 is a C-C schematic structural diagram of the disclosure.
Figure 4:
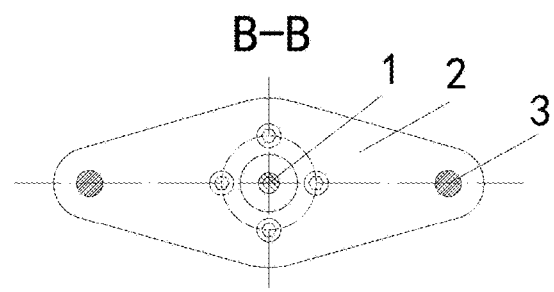
FIG. 4 is a B-B schematic structural diagram of the disclosure.
Figure 5:
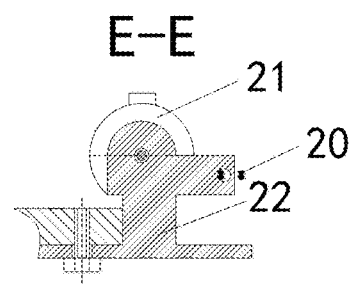
FIG. 5 is an E-E schematic structural diagram of the disclosure.
Figure 6:
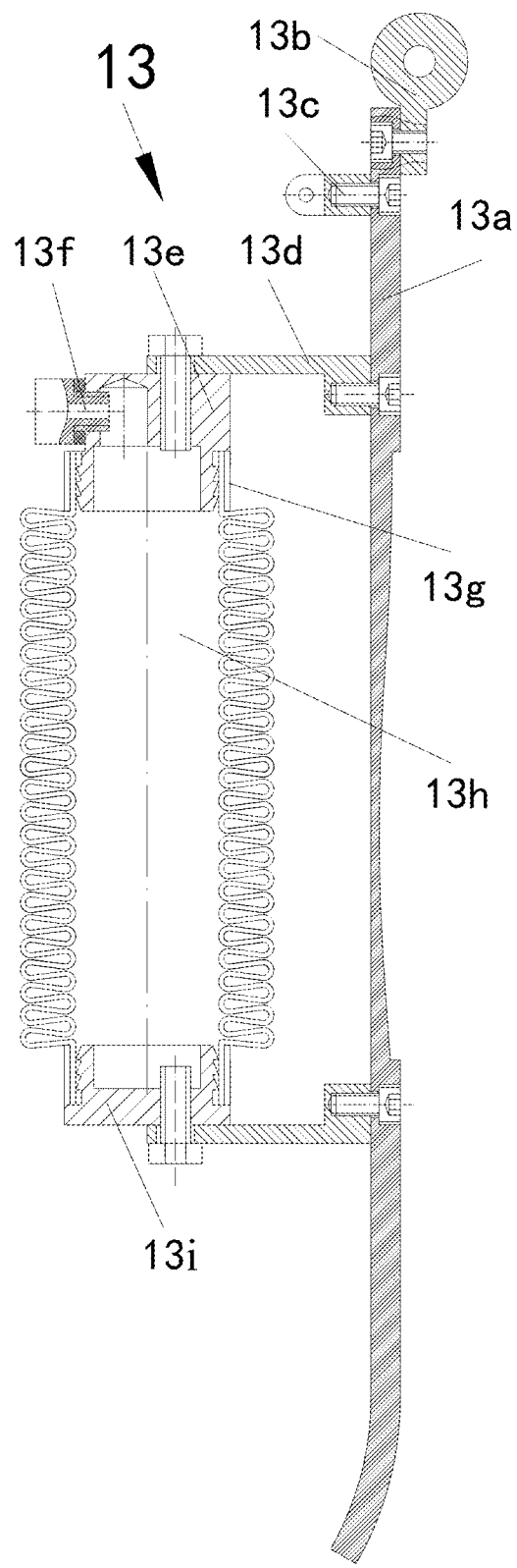
FIG. 6 is a schematic structural diagram of flexible finger components of the disclosure.

In the figures: 1 denotes a screw shaft motor; 2 denotes an upper seat plate; 3 denotes a guide coupling rod; 4 denotes a screw nut seat; 5 denotes a linear bearing; 6 denotes a driving plate; 7 denotes a push plate; 8 denotes a short push rod; 9 denotes a fixed finger holder; 10 denotes a connecting rod; 11 denotes a mounted bearing; 12 denotes a bottom seat plate; 13 denotes a flexible finger; 13a denotes a thickness special-shaped plate spring; 13b denotes a hinge seat; 13c denotes a hinge support; 13d denotes a bracket; 13e denotes a thick sealing head; 13f denotes an air pipe joint; 13g denotes a fixing clamp; 13h denotes a double-head bellows muscle; 13i denotes a thin sealing head; 14 denotes a rotating finger holder; 15 denotes a shaft sleeve; 16 denotes a long push rod; 17 denotes a rotating push plate; 18 denotes a sealing head; 19 denotes a small support; 20 denotes a tension spring; 21 denotes a single-head bellows muscle; 22 denotes a ridged push plate; and 23 denotes a round pressure plate.

DETAILED DESCRIPTION

The technical solutions in the examples of the disclosure are clearly and completely described below in conjunction with the drawings in the examples of the disclosure. It is apparent that the described examples are only a part of the examples of the disclosure, but are not all of the examples. Based on the examples in the disclosure, all other examples obtained by those of ordinary skill in the art without creative efforts fall within the protection scope of the disclosure.

Referring to FIG. 1 to FIG. 15, the disclosure provides the following technical solutions: an electric-pneumatic hybrid-driving flexible manipulator with spring framework from plates of special-shaped thickness includes a screw shaft motor 1, an upper seat plate 2, guide coupling rods 3, linear bearings 5, a driving plate 6, a push plate 7, short push rods 8, connecting rods 10, a bottom seat plate 12, flexible fingers 13, a rotating finger holder 14, a long push rod 16, a small support 19, tension springs 20, single-head bellows muscles 21 and a ridged push plate 22. The screw shaft motor 1 is installed at an upper end of the upper seat plate 2. The upper seat plate 2 and the bottom seat plate 12 are fixed as a whole by two guide coupling rods 3. Both ends of the two guide coupling rods 3 have cylindrical sections respectively in clearance fit with holes on the upper seat plate 2 and the bottom seat plate 12. A mounted bearing 11 is arranged in a middle position of the bottom seat plate 12. A screw nut seat 4 driven by the screw shaft motor 1 is fixed on the driving plate 6. Two linear bearings 5 are installed on the driving plate 6. The two linear bearings 5 are guided by the corresponding guide coupling rods 3. The driving plate 6 moves up and down linearly. The thickness of the rotating push plate 17 is in clearance fit with the width of a guide groove on the outer side of the driving plate 6, and hinged connection is adopted through cylindrical pins so as to realize rotation. A fixed finger holder 9 is installed on the bottom seat plate 12 through screws. An upper end of a finger knuckle of the flexible finger 13 on the left is connected to a lower end of the fixed finger holder 9 through a hinge. The push plate 7 is fixedly installed on the driving plate 6. An upper end of a finger knuckle of the rotating finger holder 14 on the right middle is installed at the lower end of the fixed finger holder 9 through a hinge. The long push rod 16 is fixed on the driving plate 6. The outer sides of the long push rod 16 and the push plate 7 are both provided with the short push rod 8. The driving plate 6 drives the long push rod 16 to move up and down linearly. The long push rod 16 drives the short push rod 8 and the connecting rod 10 to adjust an included angle between the finger knuckle and the bottom seat plate 12. The short push rod 8 is connected to one end of the connecting rod 10 through a hinge. The push plate 7 drives the short push rod 8 and the connecting rod 10 to adjust the included angle between the finger knuckle of the flexible finger 13 and the bottom seat plate 12. The ridged push plate 22 drives the short push rod 8 and the connecting rod 10 to adjust the included angle between the finger knuckle of the flexible finger 13 and the bottom seat plate 12. The other end of the connecting rod 10 connected to the flexible finger 13 is connected to a hinge fixing seat on the flexible finger 13 through a hinge. The other end of the connecting rod 10 connected to the rotating finger holder 14 is connected to a hinge fixing seat on the rotating finger holder 14 through a hinge. The driving plate 6 drives the long push rod 16 to move up and down linearly. The ridged push plate 22 is arranged in middle positions of the single-head bellows muscles 21. A flat end of the single-head bellows muscles 21 is clamped and fixed on a back ridge of the ridged push plate 22. The single-head bellows muscles 21 are inflated to drive the small support 19 and the flexible finger 13 on the right outer side to rotate. Both ends of the ridged push plate 22 are provided with round pressure plates 23.

The upper ends of the finger knuckles of the two flexible fingers 13 on the right outer side are both connected to the rotating finger holder 14 through hinges. The two flexible fingers 13 on the right outer side rotate coaxially and integrally with the rotating finger holder 14 and the rotating driving plate 6. The driving comes from two single-head bellows muscles 21. A shaft sleeve 15 is sleeved over a shaft section at an upper part of the rotating finger holder 14. The shaft sleeve 15 abuts against a rotating inner ring of the small mounted bearing of the bottom seat plate 12. A threaded part of the shaft section at the upper part of the rotating finger holder 14 is tightened through a nut. The axial direction of the rotating finger holder 14 is fixed on the small mounted bearing on the bottom seat plate 12. The small mounted bearing on the bottom seat plate 12 is fixed on the bottom seat plate 12 through screws. The single-head bellows muscles 21 are fixed on a corrugated bayonet of the sealing head 18 by clamps. The sealing head 18 with an air pipe joint is fixed on the small support 19. The small support 19 is fixed on the driving plate 6. One ends of two tension springs 20 are hooked into a hole on the back ridge of the ridged push plate 22. The other ends of the tension springs 20 are hooked into holes on the small support 19. The other end of the connecting rod 10 of the short push rod 8 installed on the outer side of the driving plate 6 is connected to the hinge fixing seat on the flexible finger 13 through the hinge.

The flexible finger 13 includes a thickness special-shaped plate spring 13a, a hinge seat 13b, a hinge support 13c, a bracket 13d, a thick sealing head 13e, an air pipe joint 13f, fixing clamps 13g, double-head bellows muscles 13h and a thin sealing head 13i. The hinge seat 13b is fixedly installed on the thickness special-shaped plate spring 13a. Upper ends of the double-head bellows muscles 13h are fixed on a corrugated bayonet of the thick sealing head 13e by the clamps. The air pipe joint 13f is screwed on the thick sealing head 13e through threads. Lower ends of the double-head bellows muscles 13h are fixed on a corrugated bayonet of the thin sealing head 13i by the clamps. Both the thick sealing head 13e and the thin sealing head 13i are fixed on the bracket 13d. The hinge support 13c is fixed on the thickness special-shaped plate spring 13a. A thick torsion spring is sleeved over a hinge mandrel.

Figures 7, 8:
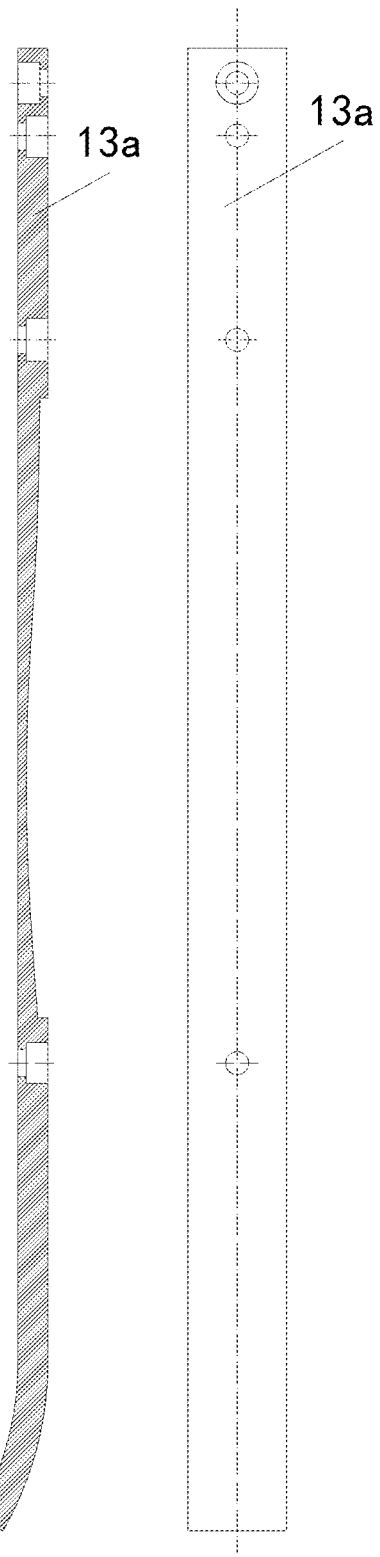
FIG. 7 is a schematic structural diagram of a thickness special-shaped plate spring of the disclosure.
FIG. 8 is a left-view schematic structural diagram of the thickness special-shaped plate spring of the disclosure.
Figure 9:
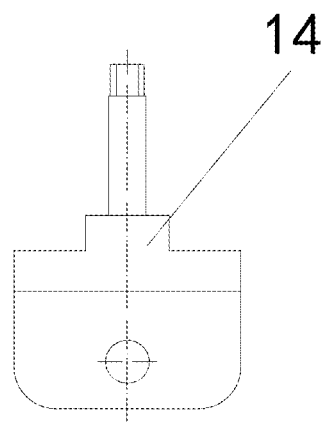
FIG. 9 is a front-view schematic structural diagram of a rotating finger holder of the disclosure.
Figure 10:
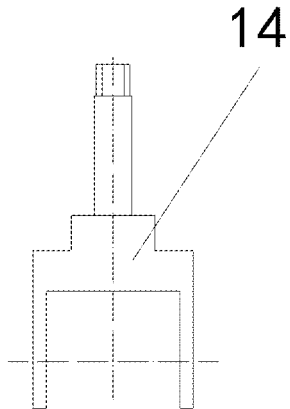
FIG. 10 is a side-view schematic structural diagram of the rotating finger holder of the disclosure.
Figure 11:
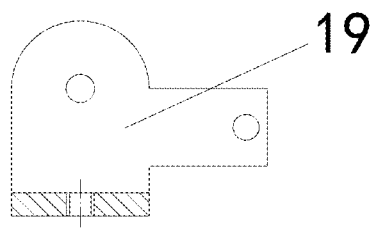
FIG. 11 is a front-view schematic structural diagram of a small support of the disclosure.
Figure 12:
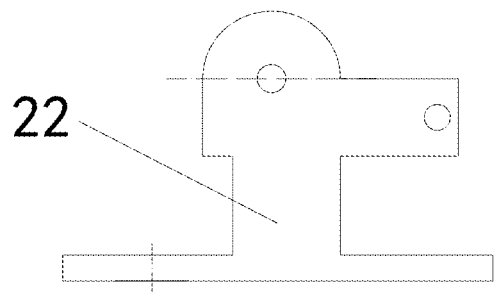
FIG. 12 is a side-view schematic structural diagram of the small support of the disclosure.
Figure 13:
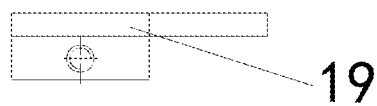
FIG. 13 is a front-view schematic structural diagram of a ridged push plate of the disclosure.
Figure 14:
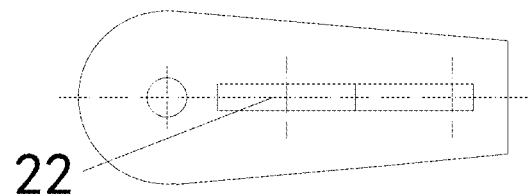
FIG. 14 is a top-view schematic structural diagram of the ridged push plate of the disclosure.
Figure 15:
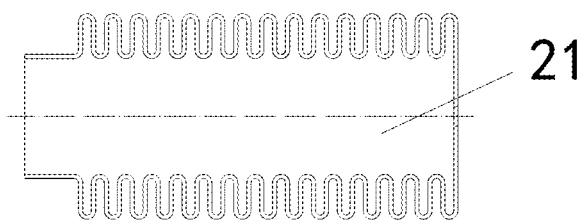
FIG. 15 is a schematic structural diagram of single-head bellows muscles of the disclosure.

Because the driving force of the double-head bellows muscles 13h generates the largest stress on cross sections of upper and lower ends of a thickness-variable part and generates the smallest stress on a middle cross section, the grasping force acting on a cantilever end (fingertip position) generates the largest stress at the upper end of the thickness-variable part and generates the smallest stress at the lower end, and the stress generated by the driving force is superposed with the stress generated by the grasping force in a grasping state, according to the driving force and the grasping force, from the perspective of equal strength design, as shown in FIG. 7 to FIG. 8, the wall thickness of a middle part of the thickness special-shaped plate spring 13a is variable, that is, the wall thickness of the upper end of the thickness-variable part is large and the wall thickness of the lower end is small, and the wall thickness of a lower part of the middle section (fingertip direction) is the smallest. The material of the thickness special-shaped plate spring 13a is spring steel, an equal thickness section of the thickness special-shaped plate spring has a large wall thickness and small elastic deformation, and counter bores are provided in a thickness direction.

The working principles and using processes of the disclosure are as follows: when the flexible manipulator of the disclosure is used, after optimizing calculation for a specific grasped object, the grasping posture and contact point position corresponding to the required grasping force can be calculated, and the grasping posture and the contact point position are accurately controlled synergistically by the rotation angle of a motor and the internal pressure of the bellows muscles. Specifically, ① when the same type of complex objects (such as apples) with inconsistent shapes and sizes are grasped, by selecting appropriate torsion spring parameters and finger structure sizes, the adaptability of degrees of freedom can be realized, and this type of complex objects cannot be damaged and can be grasped reliably; ② when complex objects (such as apples, oranges, tangerines and other spheres, or large and small boxes and other tetragons) of the same shape with large changes in shape and size are grasped, by selecting appropriate torsion spring parameters and finger structure sizes, the adaptability of degrees of freedom can be realized, and the complex objects of the same shape cannot be damaged and can be grasped reliably; and ③ when complex objects (such as apples, oranges, tangerines and other spheres and small boxes and other tetragons) of different shapes and different sizes are grasped simultaneously, by appropriately selecting torsion spring parameters and finger structure sizes and making the internal pressure of the single-head bellows muscles 21 accurate and overcoming the tension of the tension spring 20 to adjust the finger transposition, the adaptability of degrees of freedom can be realized, and the complex objects of different shapes cannot be damaged and can be grasped reliably.

By accurately controlling the finger transposition angle, an eagle-claw-imitated logistics packaging manipulator of the disclosure can vertically grasp cylindrical, square, spherical and ellipsoidal objects or horizontally grasp spherical, cylindrical and square objects, so as to adapt to the shapes of grasped objects and meet the requirements of vertical and horizontal placement changes.

According to shapes (such as a cylindrical shape and a rectangular shape) and sizes of objects and physical characteristics of materials, various configuration states of manipulator fingers are simulated through ADAMS software, so as to determine the suitable shape and size range of each configuration and the suitable conditions that objects cannot be damaged and can be grasped reliably (without falling off), and determine the final grasping configuration, the contact point position and the size and direction of the contact force of the eagle claw-imitated logistics packaging manipulator.

Due to a flexible finger structure, the states of the manipulator include: ① no-load movement of fingers without contact; ② a zero state of contact force after contact; ③ no movement of an object after contact, increase in contact force, and change in acting point position and direction of contact force; ④ no movement of an object after contact, and a maximum state of contact force; ⑤ grasping movement of synchronous acceleration displacement of an object and a manipulator, and change in acting point position, size and direction of contact force; ⑥ grasping movement of synchronous uniform displacement of an object and a manipulator, and change in acting point position, size and direction of contact force; ⑦ grasping movement of synchronous deceleration displacement of an object and a manipulator, and change in acting point position, size and direction of contact force; and ⑧ a hovering state in which an object and a manipulator are stationary.

During dynamic control, ① in the case of no-load movement of fingers without contact, path planning of fingertips for avoiding interference with a conveying belt or a table top of an operating platform is determined, so as to form a dynamic control strategy for motor rotation and bellows muscle pressure driving; ② in the case of no movement of an object after contact and a maximum state of contact force, the contact force suddenly changes when the object is lifted, and the internal pressure of the bellows muscles can be adjusted by control of a pressure transmitter and a high-speed switching valve; and ③ in the case of synchronous acceleration displacement or deceleration displacement of an object and a manipulator, the internal pressure of the bellows muscles can be adjusted adaptively.

Although the examples of the disclosure have been shown and described, for those of ordinary skill in the art, it can be understood that various changes, modifications, replacements and variations can be made to these examples without departing from the principles and spirits of the disclosure. The scope of the disclosure is defined by the appended claims and equivalents thereof.

What is claimed is:

1. A flexible manipulator, comprising a screw shaft motor (1), an upper seat plate (2), guide coupling rods (3), linear bearings (5), a driving plate (6), a push plate (7), short push rods (8), connecting rods (10), a bottom seat plate (12), flexible fingers (13), a rotating finger holder (14), a long push rod (16), a small support (19), tension springs (20), single-head bellows muscles (21) and a ridged push plate (22), wherein the screw shaft motor (1) is installed at an upper end of the upper seat plate (2), the upper seat plate (2) and the bottom seat plate (12) are fixed as a whole by two guide coupling rods (3), both ends of the two guide coupling rods (3) have cylindrical sections in clearance fit with holes on the upper seat plate (2) and the bottom seat plate (12), respectively, a mounted bearing (11) is arranged in a middle position of the bottom seat plate (12), a screw nut seat (4) driven by the screw shaft motor (1) is fixed on the driving plate (6), two linear bearings (5) are installed on the driving plate (6), the two linear bearings (5) are guided by the corresponding guide coupling rods (3), and the driving plate (6) moves up and down linearly; a fixed finger holder (9) is installed on the bottom seat plate (12) through screws, an upper end of a finger knuckle of the flexible finger (13) on a left part is connected to a lower end of the fixed finger holder (9) through a hinge, the push plate (7) is fixedly installed on the driving plate (6), an upper end of a finger knuckle of the rotating finger holder (14) on a right middle part is installed at the lower end of the fixed finger holder (9) through a hinge, the long push rod (16) is fixed on the driving plate (6), outer sides of the long push rod (16) and the push plate (7) are both provided with the short push rod (8), the short push rod (8) is connected to a first end of the connecting rod (10) through a hinge, a second end of the connecting rod (10) connected to the flexible finger (13) is connected to a hinge fixing seat on the flexible finger (13) through a hinge, the second end of the connecting rod (10) connected to the rotating finger holder (14) is connected to a hinge fixing seat on the rotating finger holder (14) through a hinge, the driving plate (6) drives the long push rod (16) to move up and down linearly, the ridged push plate (22) is arranged in middle positions of the single-head bellows muscles (21), and both ends of the ridged push plate (22) are provided with round pressure plates (23);

the upper ends of the finger knuckles of the two flexible fingers (13) on a right outer side are both connected to the rotating finger holder (14) through hinges, the two flexible fingers (13) on the right outer side rotate coaxially and integrally with the rotating finger holder (14) and the rotating driving plate (6), driving comes from two single-head bellows muscles (21), a shaft sleeve (15) is sleeved over a shaft section at an upper part of the rotating finger holder (14), the shaft sleeve (15) abuts against a rotating inner ring of a small mounted bearing of the bottom seat plate (12), a threaded part of the shaft section at the upper part of the rotating finger holder (14) is tightened through a nut, an axial direction of the rotating finger holder (14) is fixed on the small mounted bearing on the bottom seat plate (12), the small mounted bearing on the bottom seat plate (12) is fixed on the bottom seat plate (12) through screws, the single-head bellows muscles (21) are fixed on a corrugated bayonet of a sealing head (18) by clamps, the sealing head (18) with an air pipe joint is fixed on the small support (19), the small support (19) is fixed on the driving plate (6), one ends of the two tension springs (20) are hooked into a hole on a back ridge of the ridged push plate (22), other ends of the tension springs (20) are hooked into holes on the small support (19), and the second end of the connecting rod (10) of the short push rod (8) installed on an outer side of the driving plate (6) is connected to the hinge fixing seat on the flexible finger (13) through the hinge;

the flexible finger (13) comprises a spring from plates of special-shaped thickness (13*a*), a hinge seat (13*b*), a hinge support (13*c*), a bracket (13*d*), a thick sealing head (13*e*), an air pipe joint (13*f*), fixing clamps (13*g*), double-head bellows muscles (13*h*) and a thin sealing head (13*i*), the hinge seat (13*b*) is fixedly installed on the spring from plates of special-shaped thickness (13*a*), upper ends of the double-head bellows muscles (13*h*) are fixed on a corrugated bayonet of the thick sealing head (13*e*) by clamps, the air pipe joint (13*f*) is screwed on the thick sealing head (13*e*) through threads, lower ends of the double-head bellows muscles (13*h*) are fixed on a corrugated bayonet of the thin sealing head (13*i*) by clamps, both the thick sealing head (13*e*) and the thin sealing head (13*i*) are fixed on the bracket (13*d*), the hinge support (13*c*) is fixed on the spring from plates of special-shaped thickness (13*a*), and a thick torsion spring is sleeved over a hinge mandrel; according to a driving force and a grasping force, from a perspective of equal strength design, a wall thickness of a middle part of the spring from plates of special-shaped thickness (13*a*) is variable, that is, a wall thickness of an upper end of a thickness-variable part is large and a wall thickness of a lower end is small, and a wall thickness of a lower part of a middle section in a fingertip direction is the smallest; and a material of the spring made of plates of special-shaped thickness (13*a*) is spring steel, an equal thickness section of the spring from plates of special-shaped thickness has a large wall thickness and small elastic deformation, and counter bores are provided in a thickness direction.

2. The flexible manipulator according to claim 1, wherein the push plate (7) drives the short push rod (8) and the connecting rod (10) to adjust an included angle between the finger knuckle of the flexible finger (13) and the bottom seat plate (12), and the ridged push plate (22) drives the short push rod (8) and the connecting rod (10) to adjust the included angle between the finger knuckle of the flexible finger (13) and the bottom seat plate (12).

3. The flexible manipulator according to claim 1, wherein a thickness of a rotating push plate (17) is in clearance fit with a width of a guide groove on the outer side of the driving plate (6), and hinged connection is adopted through cylindrical pins so as to realize rotation.

4. The flexible manipulator according to claim 1, wherein a flat end of the single-head bellows muscles (21) is clamped and fixed on the back ridge of the ridged push plate (22).

5. The flexible manipulator according to claim 1, wherein the single-head bellows muscles (21) are inflated to drive the small support (19) and the flexible finger (13) on the right outer side to rotate.

6. The flexible manipulator according to claim 1, wherein the driving plate (6) drives the long push rod (16) to move up and down linearly, and the long push rod (16) drives the short push rod (8) and the connecting rod (10) to adjust an included angle between the finger knuckle and the bottom seat plate (12).

* * * * *